United States Patent
Ohmer et al.

(10) Patent No.: US 10,605,582 B2
(45) Date of Patent: Mar. 31, 2020

(54) CALIPER TOOL WITH POSITIVE PIVOTING ARM

(71) Applicant: PROBE HOLDINGS, INC., Houston, TX (US)

(72) Inventors: Herve Ohmer, Houston, TX (US); Monty D. Mayfield, Arlington, TX (US)

(73) Assignee: PROBE HOLDINGS, INC., Houston, TX (US)

(*) Notice: Subject to any disclaimer, the term of this patent is extended or adjusted under 35 U.S.C. 154(b) by 113 days.

(21) Appl. No.: 15/571,095

(22) PCT Filed: Apr. 29, 2016

(86) PCT No.: PCT/US2016/029932
§ 371 (c)(1),
(2) Date: Nov. 1, 2017

(87) PCT Pub. No.: WO2016/178939
PCT Pub. Date: Nov. 10, 2016

(65) Prior Publication Data
US 2018/0172418 A1 Jun. 21, 2018

Related U.S. Application Data

(60) Provisional application No. 62/155,993, filed on May 1, 2015.

(51) Int. Cl.
*E21B 47/00* (2012.01)
*G01B 5/12* (2006.01)
(Continued)

(52) U.S. Cl.
CPC ............ *G01B 5/12* (2013.01); *E21B 47/0006* (2013.01); *E21B 47/08* (2013.01); *G01B 3/26* (2013.01);
(Continued)

(58) Field of Classification Search
CPC ................................. E21B 47/00; E21B 47/02
(Continued)

(56) References Cited

U.S. PATENT DOCUMENTS 2,789,357 A  4/1957  Schramm
2,795,856 A  6/1957  Reesby et al.
(Continued)

OTHER PUBLICATIONS

Canadian Office Action dated Jul. 31, 2018, for Canadian Patent Application No. 2,983,895.
(Continued)

*Primary Examiner* — George B Bennett
(74) *Attorney, Agent, or Firm* — Patterson + Sheridan, LLP (57) ABSTRACT

A tool for evaluating the internal surfaces of tubular is provided, wherein one or more arms extend outwardly from the tool to contact an inner wall surface of the tubular, and changes in the dimensions or condition of the inner wall result in changes in the position of the ends of the arms relative to the tool. This motion is converted, through an electromagnetic transducer. The probe arms extending from the tool are releasably held in bores formed by opposed members on the tool, within which the probe arms may pivot. The internal end of the probe arms need not be physically secured to an internal element of the tool, yet still enable motion of an internal components to actuate a transducer to provide electrical signals indicative of the tip of the probe arm relative to the tool as the tool traverses a tubular, such as a wellbore casing.

17 Claims, 7 Drawing Sheets

(51) Int. Cl.
*E21B 47/08* (2012.01)
*G01B 3/26* (2006.01)
*G01B 5/28* (2006.01)
*E21B 17/10* (2006.01)
*E21B 47/12* (2012.01)

(52) U.S. Cl.
CPC ............ *G01B 5/28* (2013.01); *E21B 17/1021* (2013.01); *E21B 47/12* (2013.01)

(58) Field of Classification Search
USPC .................................................. 33/302, 304
See application file for complete search history.

(56) References Cited

U.S. PATENT DOCUMENTS

| | | | |
|---|---|---|---|
| 2,825,141 A | | 3/1958 | Kinley et al. |
| 2,853,788 A | | 9/1958 | Kinley |
| 3,077,670 A | * | 2/1963 | Waters ................. E21B 47/026 324/367 |
| 4,299,033 A | | 11/1981 | Kinley et al. |
| 4,320,579 A | | 3/1982 | Kinley et al. |
| 4,467,526 A | * | 8/1984 | Otte .................. E21B 47/02232 33/304 |
| 4,625,165 A | * | 11/1986 | Rothstein ............... G01B 7/281 324/220 |
| 4,780,962 A | * | 11/1988 | Smith ................... G01B 5/207 33/302 |
| 5,299,359 A | | 4/1994 | Estes et al. |
| 2005/0259512 A1 | | 11/2005 | Mandal |
| 2015/0323697 A1 | * | 11/2015 | Ohmer ..................... G01V 3/30 324/333 |
| 2016/0076359 A1 | * | 3/2016 | Danisch ................. E02D 31/00 33/304 |

OTHER PUBLICATIONS

Preliminary Report on Patentability in related application PCT/US2016029932 dated Nov. 16, 2017.
Canadian Office Action dated Jun. 4, 2019, for Canadian Patent Application No. 2,983,895.
European Office Action dated Mar. 26, 2019, for EP 16724990.3.
International Search Report and Written Opinion in related application PCT/US2016/029932 dated Sep. 30, 2016.
PCT International Search Report and Written Opinion dated Sep. 30, 2016, for International Patent Application No. PCT/US2016/029932.

* cited by examiner

CALIPER TOOL WITH POSITIVE PIVOTING ARM

BACKGROUND OF THE INVENTION

Field of the Invention

The present disclosure relates to the field of analysis of the condition of interior surface of tubulars. More particularly, the present disclosure relates to the determination of the condition of the inner surfaces of tubulars, for example piping carrying fluids, including well bore tubulars, wherein the condition of the tubular is determined by passing a multi-arm caliper device through the tubular, wherein the condition of the tubular and the interior wall surfaces thereof are inferred from the measurement data received from the multi arm caliper.

Description of the Related Art

Multi-arm caliper tools are widely used to evaluate the interior condition of tubulars, such as piping, as well as in the field of cased hole wireline logging in order to determine the geometrical properties, including the physical condition such as the presence of erosion, cracking, buckling, and the like, of the inner surface of tubulars such as casing, liners or tubings. Multi-arm calipers are provided with a plurality of caliper arms extending around a longitudinal centerline or axis of the tool, such that radii extending from the centerline of the tool to the adjacent tubular inner surface may be measured at a plurality of angular locations around the tool longitudinal axis at a relatively high frequency using caliper arms extending from the body of the tool, and these measurements are recorded in the tool and/or transmitted along a wireline to a remote location for recording or analysis. The data is used to assess the integrity of the interior surface or wall of the tubular, and can be used to locate areas of wall erosion, kinks, abnormal bending, or other geometrical physical indicia of impending loss of the fluid sealing integrity of the tubular. If the tool data indicates an issue with the integrity of the wall or inner surface of the tubular, the owner or operator of the equipment or well in which the tubular is used can take remedial steps, such as locating a liner over the location of the tubular in which there is an integrity issue, replacing the tubular (such as where a secondary tubing was extended into, but not cemented into place, in a well bore, or the tubular is in process equipment and can be accessed for replacement) or sealing off the location in the tubular where the integrity issue is present. Where the tubular is a casing or liner permanently fixed in a well bore, and the well is still producing, the owner or operator of the well will need to determine whether the cost of drilling an additional well to the producing formation location is economically profitable if the well is closed off.

In one multi-arm caliper tool where the tool is pulled or pushed within the tubular, the tool includes mechanical probe arms that contact the inner surface of the tubular and mechanically transfer the radial geometric variations of the tubular to a transducer individually associated with each arm that in turn converts the mechanical variations of the distance from the tip of the arm in contact with the inner surface of the tubular to the tool housing into electric signals that are fed to a data processing and transmission system, which may be on-board the tool or which may be transmitted, via a wireline, to a remote location such as a surface location where a casing in a well bore is being evaluated. Alternately the signal may be simply recorded within a recorder that is located within or in the vicinity of the caliper tool as part of the downhole tool. The probe arms are supported on individual pins inserted into, and extending from, the walls or sides of openings in the outer wall of the tool, and as such variation in the pivot location of the probe arms is inherent. Alternatively, the pivot of the probe arm may be provided by hooking the arm onto a V shaped sharp edge forcing the arm to roll over this sharp edge, which makes the pivot axis speculative or theoretical. The probe arms are also physically pinned or otherwise attached to a shaft on the interior of the tool, which extends from the arm to the location of a transducer. This construct leads to difficulty in the assembly of the device, as the probe arms must be pinned or otherwise physically attached to a tool element inside the body. This is even more difficult where the probe arm is also pinned at the pivot location. The need for physical securement or attachment of the probe arm to an internal tool element requires clearance within the tool body for inserting the probe arm and attaching to the internal body element, such as a shaft extending inwardly of a transducer. Where the pivot is physically secured over a pin secured to a sidewall of an opening in the caliper tool body, the opening must be at least as wide as the pin height plus the probe arm width, which limits the number of probe arms that can be located about the circumference of the tool.

To translate the mechanical movement of the probe into an electrical signal, each probe arm is, as above described, physically interconnected to a transducer such as a linear variable differential transformer, otherwise known as an LVDT, wherein movement of the mechanical probe arm at the end of the probe arm in contact with the inner surface of the tubular causes movement of a ferromagnetic core within an induced electric field of the transducer. As the ferromagnetic core moves in the field, it causes perturbations thereof, which are sensed by secondary coils and the resulting changes in the electric field are converted to electric signals representative of the distance the ferromagnetic core has moved in the LVDT, and, thus changes in the relative position of the end of the probe arm in contact with the inner surface of the tubular are converted into an electric signal.

The effectiveness, or thoroughness, of the inspection of the mechanical condition of the interior of the tubular being evaluated by the caliper tool is a function of the circumferential spacing of the tips of the probe arms in the extended, tubular interior contacting, position. The caliper tool can only evaluate the physical or mechanical condition of the interior of the tubular in the areas of the interior of the tubular where the tip of the probe arms have passed over. Thus, the number of probe arms that are deployed from the tool affects the integrity of the inspection result: The fewer the number of probe arms, the greater the circumferential space between adjacent contact locations of the probe arm tip with the inner wall of the tubular, and thus the greater the likelihood that a localized area of wall pitting or erosion, or other wall defect condition, will be missed as the caliper tool traverses the tubular. Additionally, as each arm will or should have the same physical dimensions, the pivot location of each arm should be the same. Where the arm includes a through cross shaft at the pivot axis, one mechanism for positioning the pivot is to allow the shaft to ride and rotate in a V-shaped groove. However, it is known that the shaft can move in this V-shaped groove, resulting in variations in the actual position of one or more arm tips vis-a-vis the tool center will have a variance which is read by the tool as a variance in the interior wall of the tool, but is actually a variance in the physical position of the arms with respect to the centerline or the tool.

Thus, there is a need for a multi-arm caliper tool which more reliably positions the pivot arm pivot location, while enabling a large number of caliper arms to be deployed from the tool.

SUMMARY OF THE INVENTION

There is provided herein a tubular wall evaluation tool including a tool body and a measuring system for determining the condition of an internal surface of a tubular, and outputting a signal representative of that condition, wherein the pivot arms are mounted into the tool without the need to secure them to pins or shafts extending from the tool body, and without the need to secure the interior end of the probe arm to a shaft or other mechanism linked to a transducer or other motion detection device.

In one aspect, the tool is a multi-arm caliper tool, wherein a plurality of probe arms are extendable therefrom and into contact with the internal surface of the tubular, and each probe arm is individually coupled to a transducer which is configured to output a signal indicative of movement of the probe arm as the tool transits the tubular, and the probe arm includes a shaft thereon which provides the connection to the tool without permanent attachment therebetween and with a high degree of alignment between the locations of adjacent pivot arms.

In another aspect, the multi-arm caliper tool includes a probe arm receiving portion having separable, complementary elements which when separate allow the probe arms to be loaded against a portion of one of the complementary elements, and the second complementary element is receivable against the other complementary element to form a bore encircling the shaft about which the probe arm rotates or swings.

In another aspect, the probe arm of the multi-arm caliper tool is received into the body thereof without physical securement to an internal element of the tool. In a further aspect, a biasing finger is actuatable against one side of the portion of the probe arm extending inwardly of the tool to cause the tip of the probe arm to move outwardly of the tool, and a securing portion is provided in the tool body to bear against a different side of the probe arm extending inwardly of the tool body, to cause the probe arms to move against the tool body to allow easy transport of the tool and run in of the tool into a tubular to be evaluated or inspected.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Provided herein are apparatus and methods for more accurately assessing the geometric condition, i.e., the actual inner wall profile and condition of a tubular, including the extent in height or depth of areas of erosion, inward bending, outward bending, weldments, seams, fissures and the like, with greater coverage of the interior surface of the tubular, and a simple way to assemble, disassemble, and repair caliper tool therefor.

Figure 1:
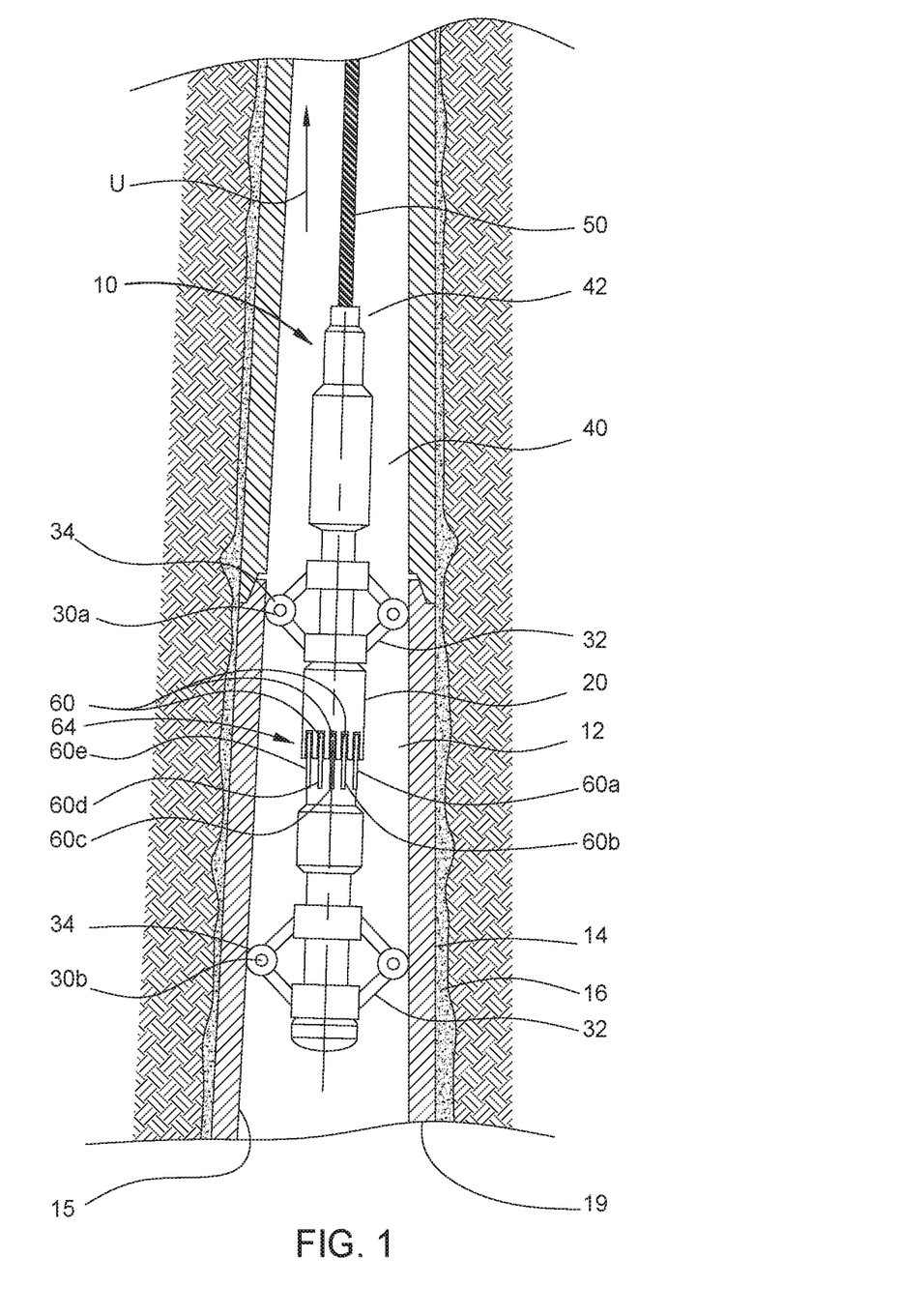
FIG. 1 is a schematic view of a multi arm caliper tool, stabilizers and wireline, with the arms of in the tool in the retracted position, suspended in a well casing.

Referring to FIG. 1, an evaluation tool 10 configured for evaluation of the interior surface of a tubular 14 described herein includes a caliper subassembly configured herein as a multi arm caliper tool 20, which is supported between a pair of centering stabilizers 30a, 30b, and a data acquisition subassembly 40 which is physically connected to the stabilizer 30a and is in communication via a link such as an electrical or optical link, with the multi-arm caliper tool 20. A line 50, which may be a wireline for communication with the caliper tool 20, is physically secured to an end 42 of the data acquisition subassembly 40 and extends to a remote location (not shown) and is used to position the tool 10 in the tubular 14. In the configuration of the tool 10 shown in FIG. 1, the tubular 14 is a casing which is held in a well bore 19 by cement 16 disposed intermediate the exterior of the casing 14 and the wall of the well bore 19. The line 50 may be a wireline, in which data signals generated in the data acquisition subassembly 40 which are indicative of the geometric condition of the inner wall 15 of the casing 14 may be transmitted to a remote surface location. Alternatively, or concurrently, the data acquisition subassembly 42 may store the results of an evaluation or inspection of the casing 14, to be analyzed upon retrieval of the tool 10 from the casing 14. The tool 10 is lowered into the casing 14 with the centering stabilizers 30a, 30b in a retracted state (not shown), and when a desired depth is reached, the arms 32 are extended to the position shown in FIG. 1, whereby rollers 34 engage the inner wall 15 of the casing 14. Although each centering stabilizers 30a, 30b are shown having two arms, at least three, and preferably more, arms 32 extend from the centering stabilizers 30a, 30b to center the multi-arm caliper tool 20 located therebetween within the casing 14.

Figure 2:
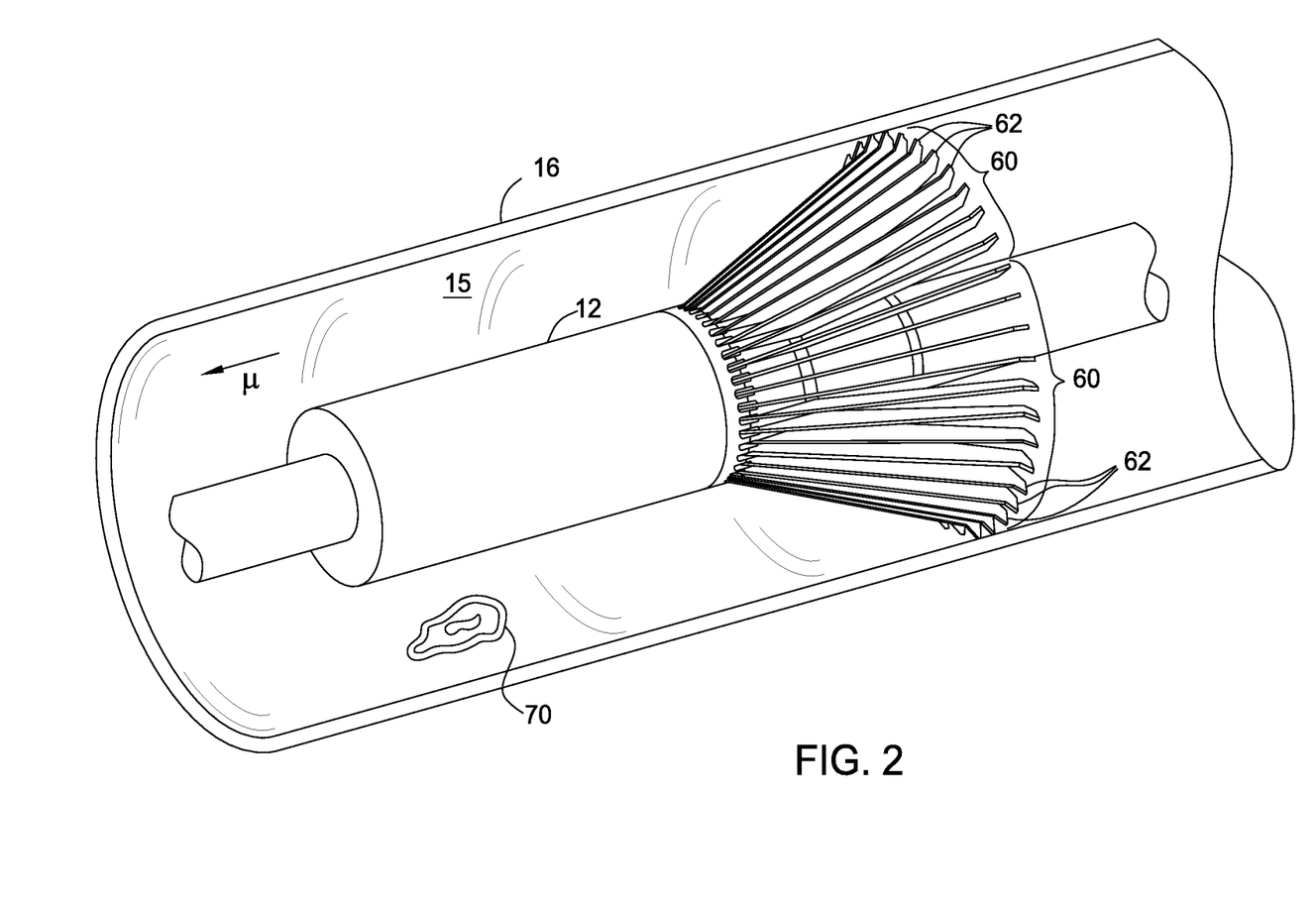
FIG. 2 is a perspective view of the caliper tool of FIG. 1 in a tubular, showing the probe arms thereof in the extended, tubular wall contacting, position.
Figure 6:
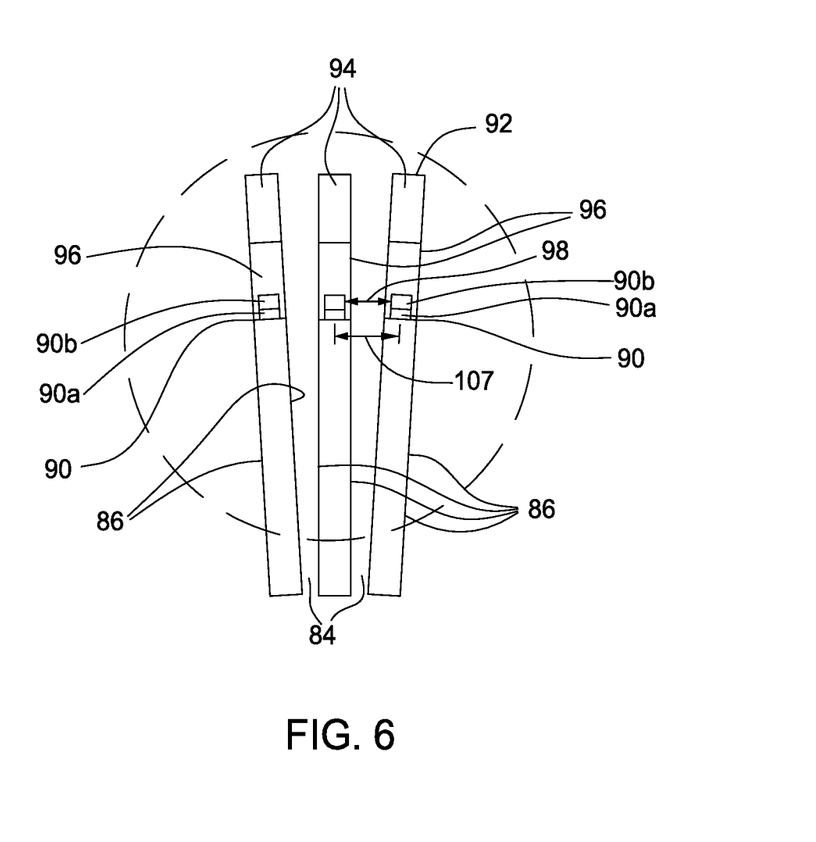
FIG. 6 is a partial end view of the caliper tool of FIG. 3, showing the details of a portion of the probe arm securing architecture thereof.

As will be described further herein, the multi-arm caliper tool 20 includes a plurality of probe arms 60. Each probe arm 60 is retractable into a position extending generally along the length of the tool to protect them as the tool 10 is lowered into the casing 14 as is shown in FIG. 1, and is also positionable in an extended position as shown in FIGS. 2 and 6 where the tips of the probe arms engage the inner wall 15 of the casing 14. Once the multi-arm caliper tool 20 is centered in the tubular in an evaluation location therefor, the probe arms 60 are freed from the retracted position, and the tips thereof engage the inner wall 15 of the casing 14. As shown in FIG. 1, wherein the casing 14 is undisturbed, i.e., is round, and does not include loss of integrity regions such as kinks, out of roundness, or wall erosion, the multi-arm caliper tool 20 is supported from above by wireline 50 (FIG. 1). A plurality of probe arms 60 are deployable to extend outwardly from the body 64 of the multi-arm caliper tool 20 and engage the inner wall 15 of casing 14 (FIG. 2). FIG. 2 shows a view of the multi-arm caliper tool 20, showing a plurality of probe arms 60, typically on the order of forty or more such probe arms 60. The greater the number of arms 60, the better is the circumferential coverage, i.e., the greater the percentage of the wall contacted by an arm, and thus evaluatable by the multi-arm caliper tool 20, for a given nominal tubular diameter.

Once the probe arms 60 of the multi-arm caliper tool 20 are deployed as shown in FIG. 2, the wireline 50 is pulled upwardly, toward the surface (not shown) at a consistent rate of 10 to 60 feet per second (f/s). As the tool 10 moves upwardly in the direction of arrow U in FIG. 1, the rollers 34 on the centering stabilizers 30a, 30b allow the tool 10 to move upwardly with minimal friction, and the multi-arm caliper tool 20 remains generally centered in the casing 14. As the multi-arm caliper tool 20 moves upwardly in the casing 14, the probe arm 60 tips are spring loaded to engage against the inner wall 15 of the casing 14, and variations in the distance from the interior (center line or other reference position) of the multi-arm caliper tool 20 with respect to the adjacent inner wall 15 along a radius over which any probe arm 60 extends results in motion of the probe arm 60 tip towards or away from the body of the multi-arm caliper tool 20. This motion is translated mechanically within the body 64 of the tool 20, in movement of a ferromagnetic core in a transducer, resulting in an electrical signal associated with each probe arm 60 as the tool traverses the well bore. Comparisons of the electrical signals associated with each probe arm 60, and adjacent probe arms 60, are used to determine the internal topography of the inner wall 15 of the casing 14, and thereby locate defects in the casing at specific depth locations thereof.

Referring again to FIG. 2, the casing 14 includes an eroded region 70. As the caliper tool moves past the eroded region, certain ones of the probe arms 60 will pass over the eroded region, and adjacent probe arms 60 to either side thereof will pass along the intact (uneroded) wall 15 of casing 14 to either side of the eroded region. As a result, the tips 62 of the probe arms 60 passing over the eroded region 70 will extend further outwardly of the body 64 of the caliper tool 20 than will the remaining probe arm tips 62, and the presence, surface area and depth of the eroded region may be determined by comparing the relative extension of the probe arm tips 62 with respect to one another. This is accomplished, in the aspect described herein, by converting the movement of the probe arm tips 62 as the caliper tool 20 is moved along the surface of the casing into electrical signals.

Referring now to FIGS. 3 to 6, the positioning and securement of a probe arm 60 into the body 64 of the caliper tool 20 is shown. For ease of understanding, only a single probe arm 60 is shown being pivotably secured to the caliper tool 20 body 64 in FIGS. 3 to 5, it being understood that all of the probe arms 60 are assembled into the tool as described for the single probe arm 60 shown in FIGS. 3 to 5.

Figure 3:
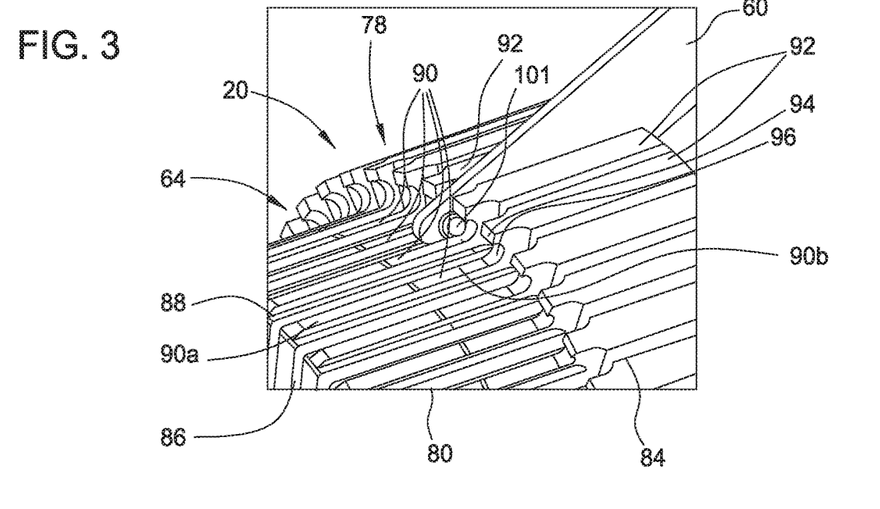
FIG. 3 is a partial perspective view of the caliper tool of FIG. 1, showing a probe arm extending therefrom and a portion of the attachment mechanism to attach the probe arm to the body of the tool.
Figure 7:
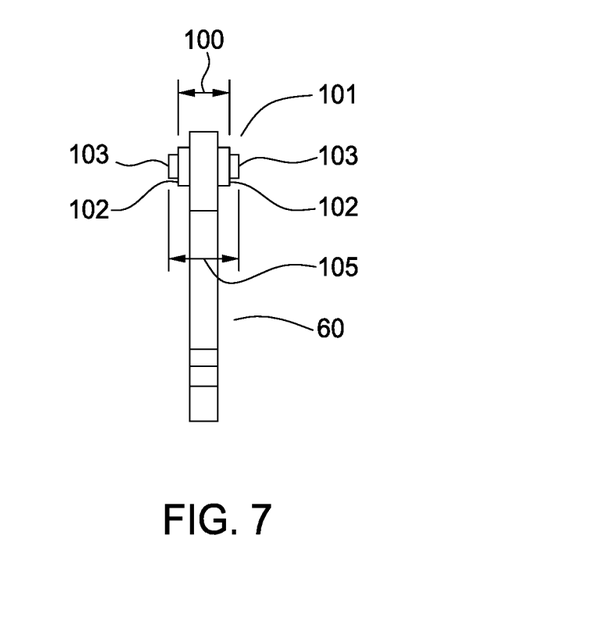
FIG. 7 is an end view of a pivot arm.

Caliper tool 20 body 64 includes a pin receiving portion 78, having a minor diameter portion 80 and a major diameter portion 82, and a plurality of elongated slots 84 extending inwardly thereof and across the major diameter 82 and minor diameter 80 portions along a radius extending from the centerline 87 of the caliper tool 20 body 64. Each slot 84 is bounded, on either side thereof in the circumferential direction, by a radial wall 86. In the minor diameter portion 80, the outer surface 88 of the radial wall 86 includes a rib 90 projecting upwardly therefrom, and generally centered on the outer surface 88. As shown in FIGS. 3 and 6, the rib 90 includes a first height portion 90a extending radially outwardly from outer surface 88, and a second height portion 90b, having a greater height from the outer surface 88 than the first height portion 90a and located adjacent to the major diameter portion 82. The major diameter portion 82 has an outer surface 92 extending further outwardly of the centerline of the caliper tool 20 body 64 than first height portion 90a and second height portion 90b, and the outer surface 92 also extends over a portion of the outer surface 88 and rib 90 of the minor diameter portion 80. A downwardly projecting wall 94 extends from the terminus of outer surface 92 extending over outer suface 88, and a generally semicircular scallop 96 extends as a continuation of the second height portion 90b of the rib 90 to the lowermost extension of the downwardly projecting wall 94. The scallop provides approximately one-half of a pin retaining bore 132 to secure the probe arms 60 in the body 64 of the tool 20. As shown in FIG. 6, the adjacent ribs 90 on adjacent radial walls are spaced at a boss spacing 98, which is slightly greater than the total spacing 100 between the outer surfaces of opposed bosses 102 of each probe arm 60, as shown in FIG. 7.

Figure 4:
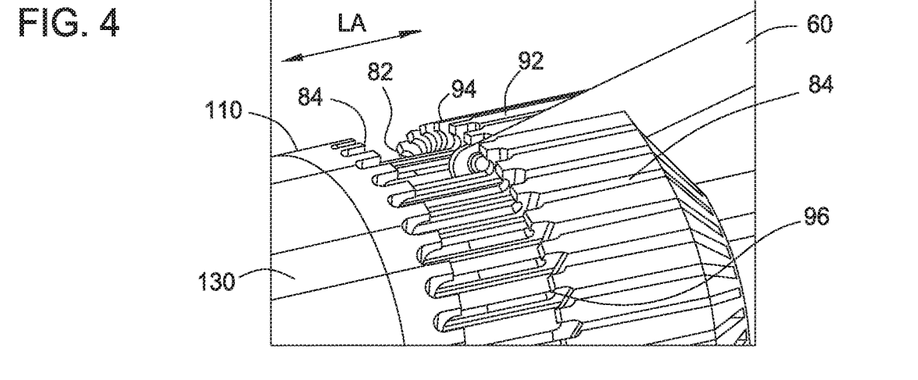
FIG. 4 is a partial perspective view of the caliper tool and probe arm of FIG. 3, further showing a retainer positioned on the tool but not yet in a probe arm securing position.
Figure 5:
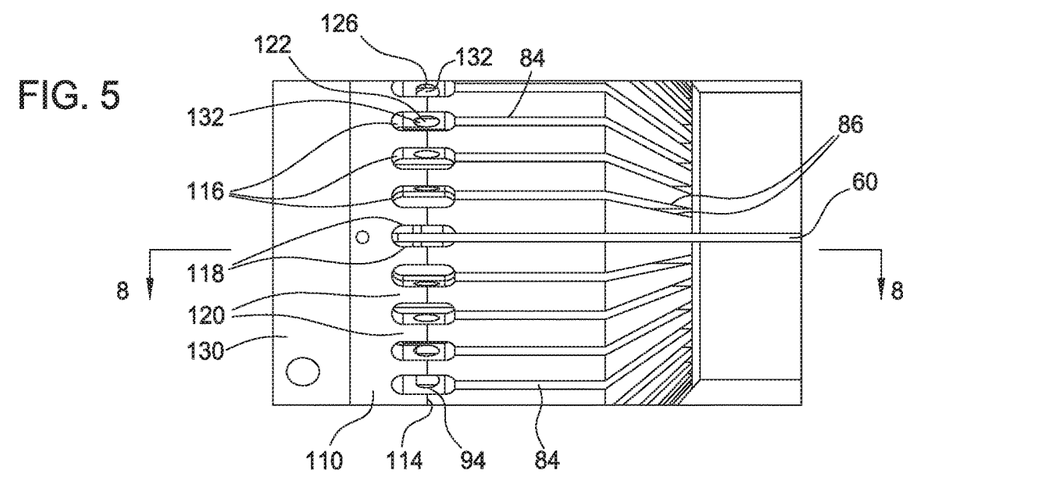
FIG. 5 is a partial perspective view of the caliper tool and probe arm of FIG. 4, showing a retainer positioned on the tool in a probe arm securing position.
Figure 8:
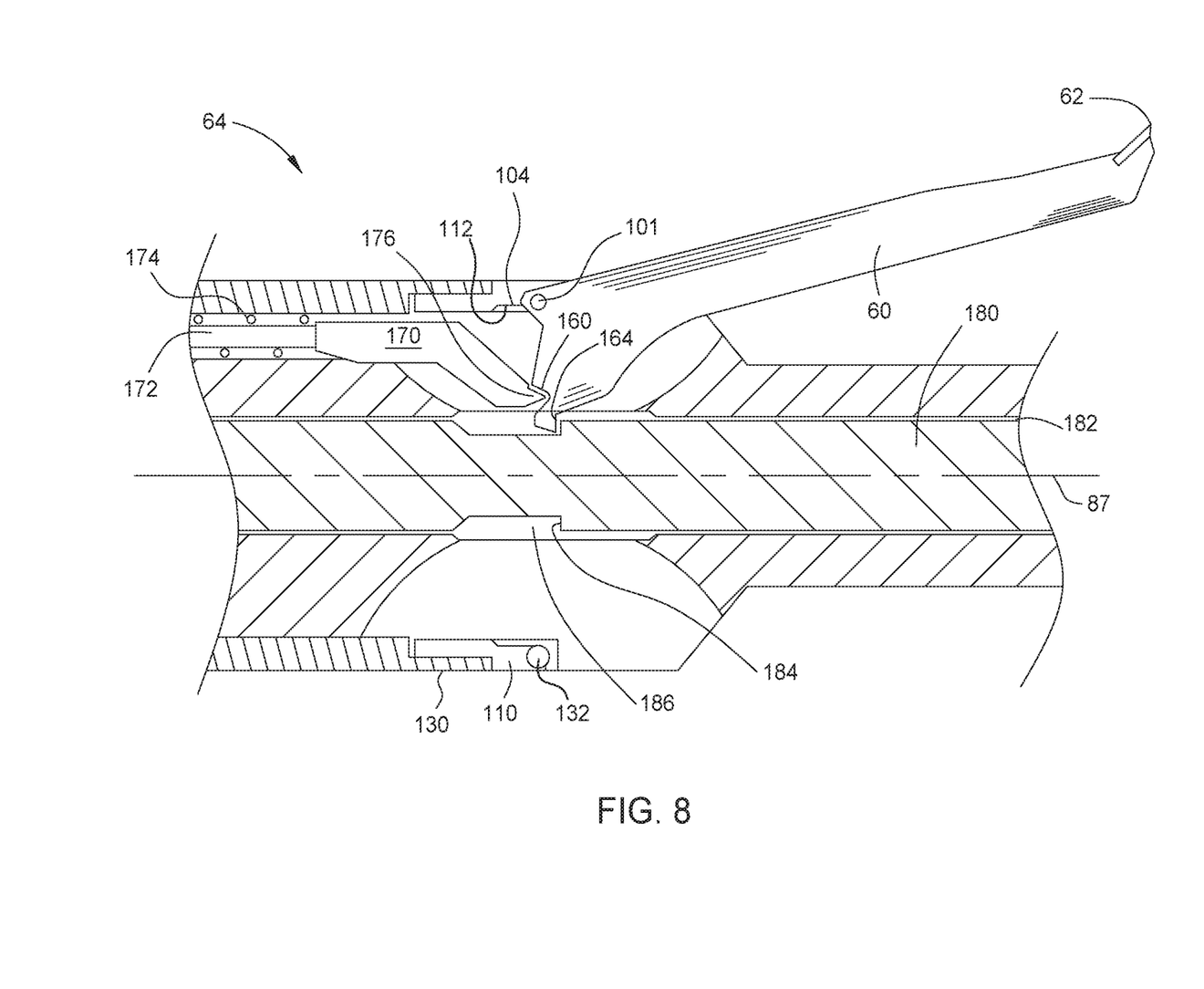
FIG. 8 is a partial sectional view of the body of the caliper tool, showing the interaction of the portion of the probe arm extending inwardly of the caliper tool with the probe arm retracting and extending elements thereof.
Figure 9:
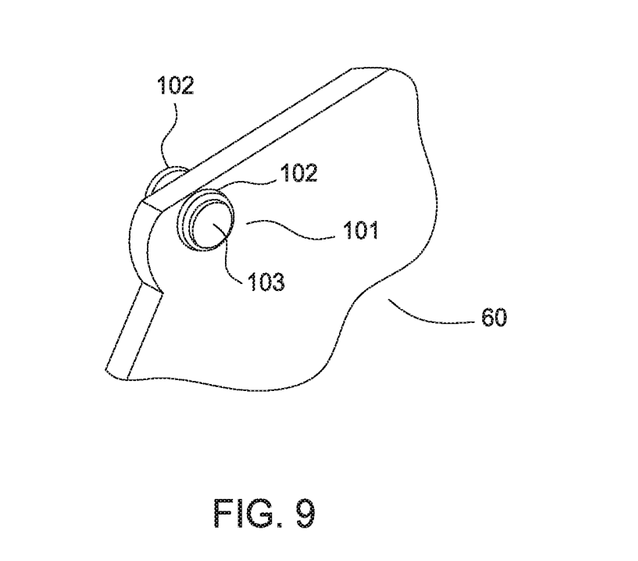
FIG. 9 is an enlarged partial view of the probe arm, showing the pin portion by which the probe arm is connected to the caliper tool body.

As further shown in FIGS. 4, 5 and 8, a retainer 110, in the form of a sleeve, is provided to retain the probe arms 60 in the body 64. The retainer 110 has an inner diameter 112 slightly larger than the outer diameter 104 of minor diameter portion 80. (FIG. 3) The retainer 100 includes an annular face 114 which, when fully loaded onto pin receiving portion 78, abuts downwardly projecting wall 94. Annular face 114 includes a plurality of recesses 116 extending inwardly thereof, equal to the number of slots 84 in pin receiving portion 78 and thus equal to the number of probe arms which may be accommodated in the body of the caliper tool 20. Each recess 116 is bound by retaining wall 118, between which extends projecting portions 120 defining the sides of the recesses 116. Each retaining wall 118 terminates, in the longitudinal direction of the caliper tool 20 body 64, in the annular wall 114, which extends downwardly therefrom to a secondary pin recess 122 which extends inwardly of the annular face 114. Each secondary pin recess 122 includes an inwardly projecting, quarter circular, cutout terminating in a cutout wall 126 extending directly to the inner surface of the retainer 110. Secondary pin recesses 122 provide a second approximate one half of the pin retaining bore 132.

As shown in FIG. 4, the retainer 110 is positioned over the minor diameter portion 80 of the pin receiving portion 78, such that it may be slid thereover in the direction of the centerline of the caliper tool body. A probe arm 60 is positioned partially inwardly of each slot 84, such that the bushing 101 thereof may be slid in the direction of the pin receiving portion 78 along the rib 90, such that the shaft 103 of the pin is engaged over the second height portion 90b of the rib 90 and into the semicircular scallop 96, and the outer diameter of the boss 102 on either side of the probe arm 60 centers the probe arm between the ribs 90 of the walls 86 on either side of the slot 84. Once the probe arms 60 are so positioned, the retainer 110 is further moved over the minor diameter portion 80, such that annular face 114 thereof abuts downwardly projecting wall 94, and the semicircular scallop, quarter circular cutout and downwardly projecting wall together provide a bore 132 to secure the shafts 103 of each probe arm 60 therein.

As best shown in FIG. 5, the termination of the slots 84 at the downwardly projecting wall 94 includes an enlarged region, equal in width to the total spacing 100, which is larger than the width of the remainder of the slot. The width of the remainder of the slot need only be wider than the width of the probe arm 60.

To maintain the annular face 114 abutting the downwardly projecting wall 94, a securing collar 130, or other linear movement restricting device, can be located on the body 64 against the rear surface of the retainer 110. The collar may be held in place by being pinned into the body 64, engaged by snap rings, or otherwise secured to the body 64.

The configuration of the slots 84 and the ribs 90, in conjunction with the configuration of the bushing 101 enable a high concentration of probe arms to be located about the circumference of the tool 20. Referring again to FIGS. 6 and 7, the total width 105 of bushing 101, as measured across the opposed outer faces of the shafts 103, is slightly less than the center to center distance 107 between two adjacent ribs 90 across each slot 84. As a result, the number of probe arms locatable on the tool is increased, and the wall coverage of the tool which can be inspected or evaluated is increased, leading to a more reliable inspection or evaluation of the tubular.

The configuration of the pin receiving portion 78 and the retainer 110 also lead to reliable positioning of the probe arm 60 in the tool 20. The outer diameter 82 of the rib 90 portion of the pin receiving portion 78, as well as the inner diameter 112 of the retainer 110, as well as the of the semicircular scallops 96 and the secondary pin recesses may all be machined into the pin receiving portion 78 and the retainer 110 by cutting on a lathe or similar tool, resulting in a high degree of precision in the relative location of the shafts of adjacent probe arms once they are positioned and secured in the tool 20, both in their circumferential spacing and in the distance of the center of each shaft from the centerline of the pin receiving portion 78. This also results in ease of calibrating the tool, as each probe arm pivot is at nearly the same distance from the centerline of the tool, limited only by the tolerance of machining the scallops 96. Thus, for any given motion of two probe arms 60 about the pivot point (shaft 103 in scallop 96), the probe arm tips 62 will be located the same distance from the side wall of the tool, subject only to the tolerances of the machining of the scallop 96, the manufacture of the probe arm 60, and the locating of the bushing 101 in the probe arm 60.

Figure 10:
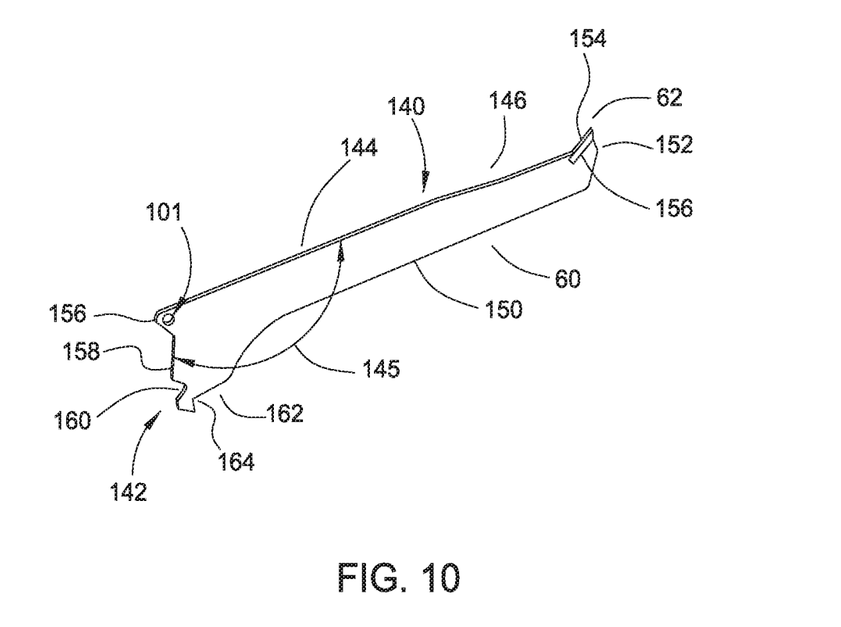
FIG. 10 is perspective view of the probe arm of FIG. 3.

As shown in FIG. 10, each probe arm 60 is configured having a generally dog-leg shape, wherein a first arm portion 140 is positioned to extend in a first direction outwardly of the slot 84 and a second arm portion 142 extends in a second direction inwardly of the body 64 within the slot 84. The extending directions of the first and second arm portions 140, 142 form an arm angle 145 greater than 90 degrees, centered at bushing 101. The probe arm 60 is secured within the slot 84 but is free to rotate about the center of the bore 132.

First arm portion 140 extends from bore 132 outwardly of slot 84 and includes an outer wall 144 disposed in a position generally facing the exterior of the caliper tool 20, and includes a recessed contoured portion 146 terminating at probe arm tip 62. On the side of the probe arm 60 opposed to outer wall 144, inner wall 150 extends, and includes an inwardly double canted face 152 adjacent the end thereof terminating at probe arm tip 62. On contoured portion 146 of outer wall 144 adjacent probe arm tip 62 is disposed an extending tip 154. First arm portion 140 is configured such the extending tip 154, which when the caliper tool is deployed for measurement and inspection of a tubular, extends outwardly from the body 64 to engage the inner surface 15 of the casing 14. Extending tip 154 is manufactured from a high wear resistant material, such as a carbide or diamond, which has higher wear resistance than the material of probe arm 60, which may comprise steel such as stainless steel. Extending tip 154 may comprise a bar shaped portion of carbide or diamond material, located on a slightly outwardly, from recessed contoured portion 146, portion 156.

Second arm portion 142 extends from bushing 101 and inwardly of a slot 84 and terminates within an opening in body 64. Second arm portion 142 includes a rear, inwardly curved wall 156, generally along a radius centered at pin, and terminating in a downwardly projecting rear wall 158 having an inwardly, generally triangular, arm projecting recess 160 extending therein. On the opposed side of second arm portion 142, inner wall 150 extends in a downwardly extending arc 162, ultimately terminating in a downward, or outwardly, projecting cam face 164. As will be described further herein, lateral force against cam face 164 moves the probe arms 60 into the retracted position as shown in FIG. 1, and removal of that force allows a spring loaded member to push inwardly of the triangular recess 160 and thereby deploy or extend the probe arm tips 62 of the probe arms 60 outwardly of the body 64.

In the aspects described herein, two different constructs of the pin 101 are specifically contemplated. In the first construct, the bushing 101 is secured against movement with respect to the probe arm 60. Thus, when the shaft 103 thereof is secured in bore 132, and when the probe arm 60 moves to move the probe arm tip 62 inwardly or outwardly of the body 64, the outer circumference of the shaft 103 slides along the surfaces of the bore 132. Thus, there is provided in this construct a small clearance between the diameter of the shaft 103 and the diameter of the bore 132. In another construct, the pins 101 on either side of probe arm 60 are interconnected by a shaft 103 extending through a bore in the body of the probe arm 60, and the probe arm 60 may freely rotate about the shaft 103 extending therethrough. In this construct, the shaft 103 of the bushing 101 need not have clearance with respect to the bore 132 and may be captured against rotation therein, or may also be allowed to freely move in the bore 132 by proper sizing of the shaft 103 and bore 132 diameters.

Referring again to FIG. 8, probe arm 60 is shown in a partially extended position, wherein a biasing finger 170, extending from a shaft 172 which is spring loaded by spring 174, pushes a finger tip 176 of the biasing finger 170 inwardly of the triangular recess 160 of the probe arm 60. Because the location in the body 64 where the finger tip 176 engages the triangular recess 160 is located inwardly of the bushing 101 and bore 132 location, movement or bias of the finger tip 176 inwardly of the triangular recess 160 will cause probe arm tip 62 end of the probe arm 60 to move away from body. During operation of the caliper tool 20 to inspect the interior of a tubular, bias of finger tip 176 within and against the triangular recess 160 maintains probe arm tip 62 into engagement against the inner wall 15 of the tubular (casing 14) as the caliper tool is pulled through the tubular.

Body 64 also includes, as shown in FIG. 8, a central bore 182 within which a central shaft 180 is reciprocally received. Central shaft includes a recess 186 therein, at the end of which is provided a radially extending ledge 184. Cam face 164 extends inwardly of recess 186. Shaft 180 is normally spring biased in a direction away from the cam face 164 by a spring, but during periods when the caliper tool 20 is being moved into the tubular to be inspected (run in), the shaft 180 is moved by an electric motor (not shown) to engage ledge 184 against cam face 164, in a direction opposed to the bias applied by the biasing finger, to overcome the bias force of the biasing finger 170 and cause the probe arm tip 62 to move in the direction of the body and thereby retract the probe arms 60 against the outer surface of the body 64. Once the caliper tool 20 is positioned for inspection of the tubular, the bias of the motor is released, and the biasing finger 170 causes finger tip 176 to push against triangular recess 160 and move probe arm tip 62 in the direction away from the body 64.

Figure 11:
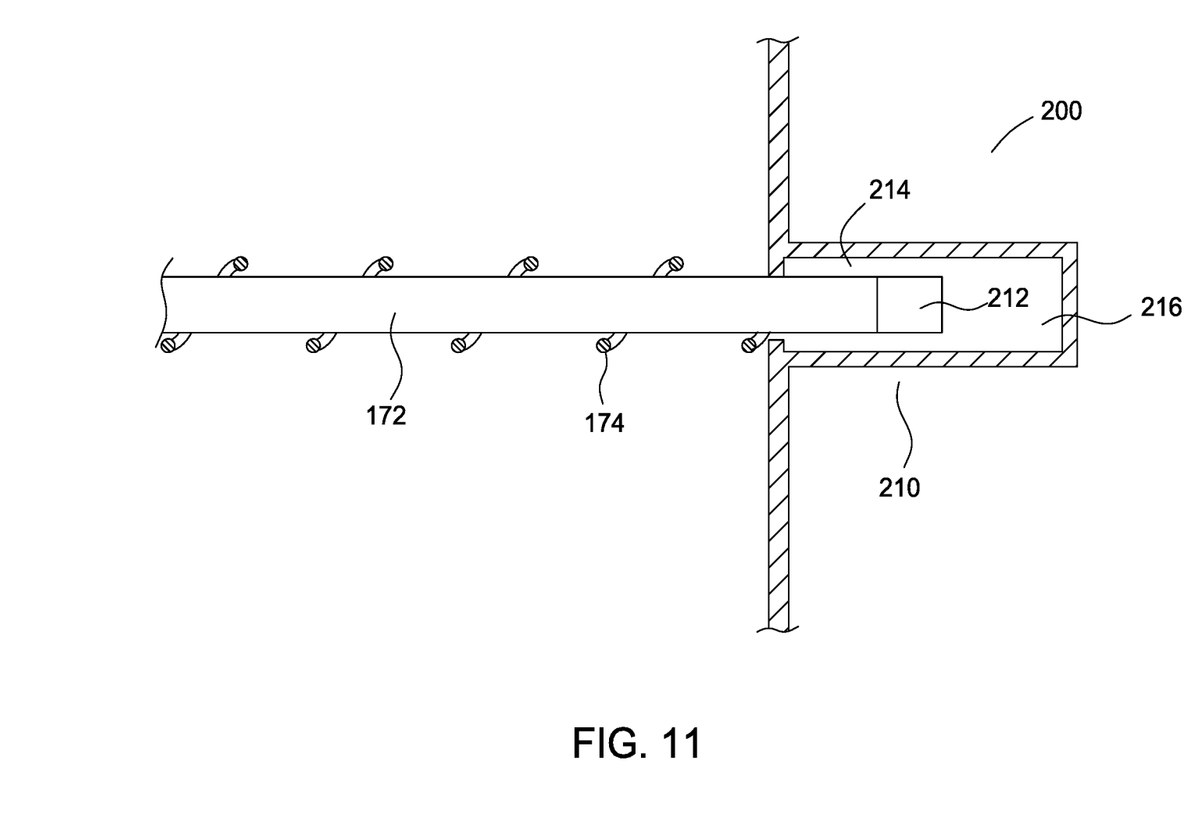
FIG. 11 is a schematic view of a transducer and the connection thereof to the probe arm.

Referring now to FIG. 11, the terminus of spring biased shaft 172 extending from the biasing finger 170 is configured to extend into a transducer pocket 200. Movement of the shaft 172 when the probe arm tip 62 is extended into position against the wall 15 of the casing 14 or other tubular is converted, in a distance sensor, by virtue of electrical signals from an LVDT 210 positioned in the transducer pocket 200. The end of shaft 172 distal to probe finger 170, or an extending linkage therefrom, extends inwardly of the transducer pocket 200 within the LVDT 210, with the ferromagnetic core 212 of the LVDT 210 disposed on the end thereof extending inwardly of the LVDT 210. Shaft 172 is biased in the direction away from the LVDT 210 by spring 174, such that, in the fully deployed or extended probe arm 60 position, the ferromagnetic core 212 will be located adjacent the first end 214 of the LVDT 210. In the probe arm 60 fully retracted position, the ferromagnetic core will be positioned adjacent the second end 216 of the LVDT 210.

As the multi arm caliper tool 20 traverses upwardly in the casing 14 and encounters a disturbance in the wall 15 thereof, the extending tip 154 thereof will move toward or away from the body 64 of the multi arm caliper tool 20. Because the arm 60 pivots about bushing 101 and/or bore 132, motion of the extending tip 154 toward and away from the body 64 translates into movement of the shaft 172 and thus the ferromagnetic core 212 generally inwardly or outwardly of the LVDT 210. This movement of the ferromagnetic core 212 in the body of the LVDT 210 generates a disturbance in the electric field of the LVDT 210, which is measured and converted to a signal which is indicative of the motion of the probe arm tip 62 caused by changes in the geometry of the wall 15 of the casing 14. The electrical signal of each probe arm (or associated LVDT), correlated with the casing 14 position where taken, is stored in data acquisition subassembly 40, and may also be transmitted to the surface by the wireline 50.

Applicants have described herein a multi-arm caliper tool 20 having a high degree of packing on probe arms thereon, having a repeatably and predicatably located pivot position from probe arm to probe arm 60 thereon, and without the need to physically attach or secure the probe arm to internal tool components. This results in a caliper tool 20 having a high degree of wall coverage of a tubular as the caliper tool is pulled through the tool, ease of assembly of the tool 20 without the need to individually connect the probe arms 60 to one or more locations of the caliper tool 20, and ease of calibration of the tool because the probe arms 60 are reliably uniformly located at the same radial distance from the centerline of the tool, with minimal tolerance therebetween.

We claim:

1. A caliper tool comprising;
    a body comprising:
        a pin receiving portion; and
        a retainer, having a pin recess, slidingly positionable with respect to the pin receiving portion;
    a transducer; and
    a probe arm comprising:
        a first portion extending from a pivot location and terminating in a probe arm tip;
        a second portion extending from the pivot location and inwardly of the body; and
        a bushing extending outwardly of the probe arm at the pivot location, the bushing including a first shaft extending therefrom; wherein:
        the shaft of the bushing is received in the pin receiving portion and retained therein by the pin recess of the retainer.

2. The caliper tool of claim 1, wherein the pin receiving portion and the pin recess further include complementary scallops.

3. The caliper tool of claim 2, wherein the complementary scallops form, when the retainer is in a first position, complimentary bearing surfaces within which the first shaft of the bushing is pivotably received.

4. The caliper tool of claim 3, wherein the retainer is moveable between a first position and a second position, and in the second position is spaced from the scallop of the pin receiving portion and the probe arm is free to be inserted or removed from the caliper tool.

5. The caliper tool of claim 3, further comprising a biasing spring coupled to the body adjacent the transducer; and
    a finger biasable by the spring in the direction of the probe arm at a location within the body.

6. The caliper tool of claim 5, further comprising a second shaft having a first end and a second end, wherein;
    the second end of the and a second shaft is connected to the finger and the first end of the second shaft comprises a portion of the transducer.

7. The caliper tool of claim 6, wherein the body further comprises a transducer pocket, and the first end of the second shaft extends inwardly of the transducer pocket.

8. The caliper tool of claim 6, wherein the body further comprises a central bore; and
    a control shaft reciprocally moveable within the central bore.

9. The caliper tool of claim 8, wherein the control shaft further comprises an arm projecting recess; and
    the probe arm further comprises a cam face on the second portion extending inwardly of the arm projecting recess.

10. The caliper tool of claim 9, wherein the finger is engageable against the second portion of the probe arm between the cam face and the pivot location.

11. The caliper tool of claim 10, wherein the first shaft of the bushing includes a first portion having a first diameter, and a second portion having a second diameter extending from the first portion.

12. The caliper tool of claim 11, wherein the bushing further includes an annular face extending between the first portion and the second portion, and the annular face spaces the opposed sides of the probe arm from adjacent surfaces of the body.

13. A probe arm for a caliper tool, comprising:
a first portion extending from a pivot location and terminating in a probe arm tip;
a second portion extending from the pivot location and inwardly of a caliper tool body; and
a bushing extending outwardly of the probe arm at the pivot location, the bushing including a shaft extending therefrom; wherein:
the second portion comprises:
a recess extending therein configured to receive a first biasing member therein to move the second portion about the pivot location and thus move the probe arm tip outwardly relative to the caliper tool body; and
a cam face configured to receive a second biasing member thereagainst to move the second portion about the pivot location and thus move the probe arm tip inwardly relative to of the caliper tool body.

14. The probe arm of claim 13, wherein the shaft of the bushing includes a first portion having a first diameter and a second portion having a second diameter, extending from the first portion.

15. The probe arm of claim 14, wherein the bushing further includes an annular face extending between the first portion and the second portion.

16. The probe arm of claim 14, wherein the first biasing member is operatively coupled to a transducer configured to convert the motion of the probe arm into an electrical signal.

17. The probe arm of claim 14, wherein the bushing is configured to be disposed between a pin receiving portion of a body and a retainer slidingly positionable on the body.

* * * * *